Nov. 26, 1935.  R. S. SANFORD  2,022,435
BRAKE
Filed Dec. 21, 1932  5 Sheets-Sheet 1

INVENTOR.
ROY S. SANFORD
BY
ATTORNEY.

Nov. 26, 1935.  R. S. SANFORD  2,022,435
BRAKE
Filed Dec. 21, 1932  5 Sheets-Sheet 2

INVENTOR.
ROY S. SANFORD
BY
ATTORNEY

Nov. 26, 1935.  R. S. SANFORD  2,022,435
BRAKE
Filed Dec. 21, 1932  5 Sheets-Sheet 3
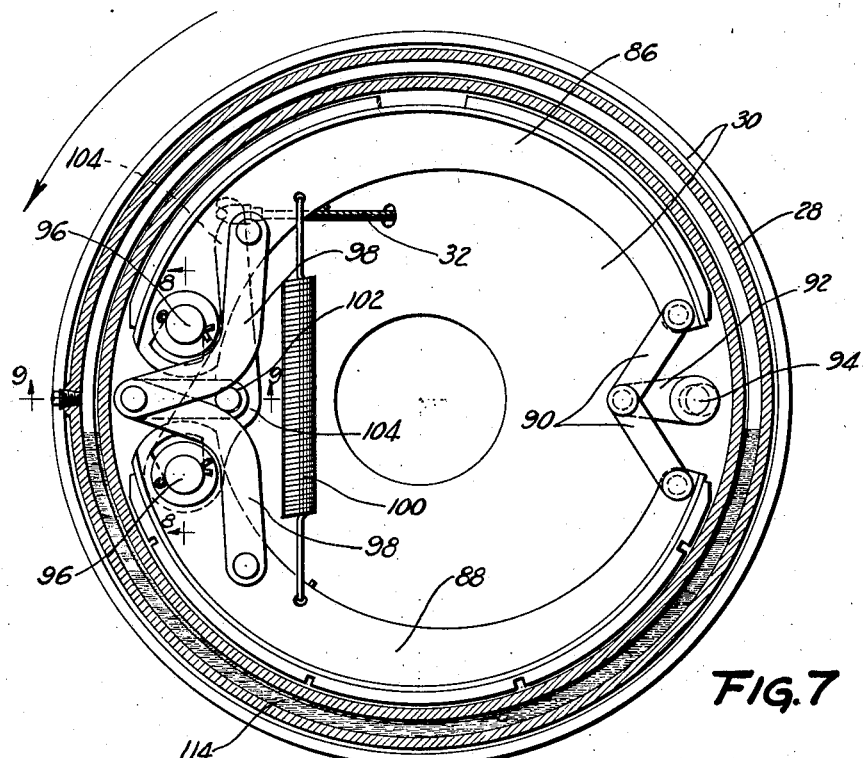
FIG.7
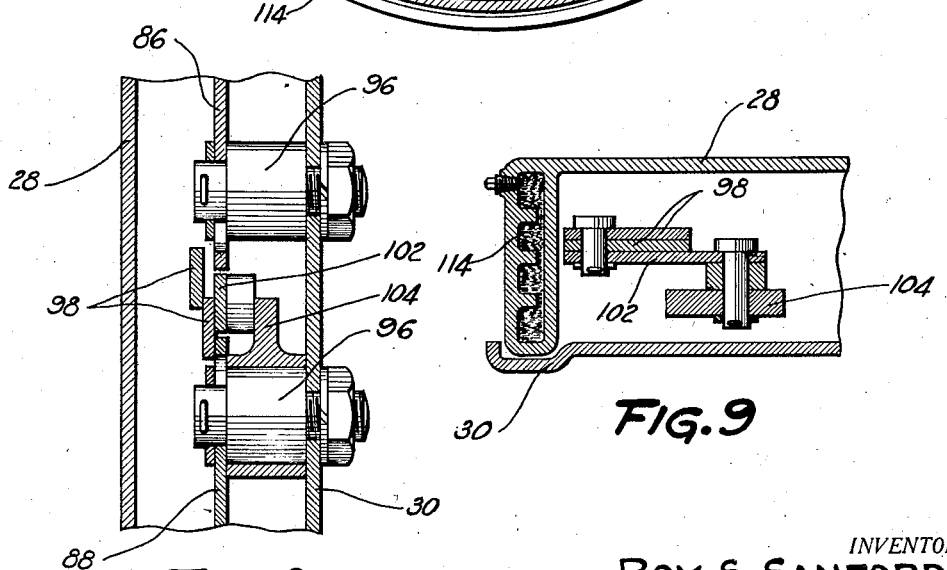
FIG.8
FIG.9
INVENTOR.
ROY S. SANFORD
BY
ATTORNEY.

Nov. 26, 1935.  R. S. SANFORD  2,022,435
BRAKE
Filed Dec. 21, 1932  5 Sheets-Sheet 4

INVENTOR.
ROY S. SANFORD
BY
ATTORNEY.

Nov. 26, 1935. R. S. SANFORD 2,022,435
BRAKE
Filed Dec. 21, 1932   5 Sheets—Sheet 5
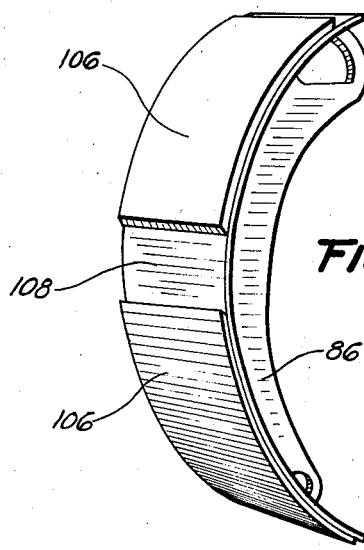
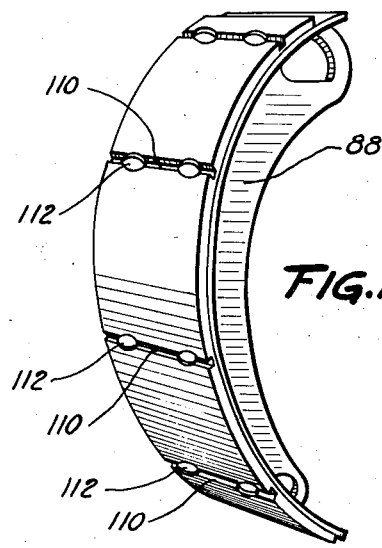
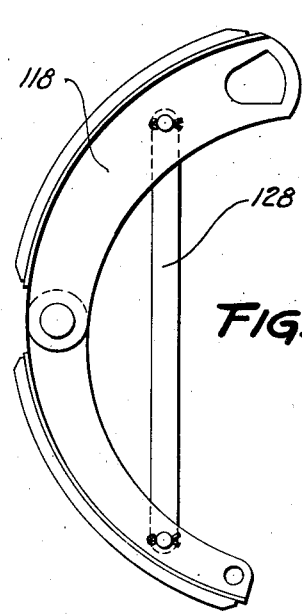
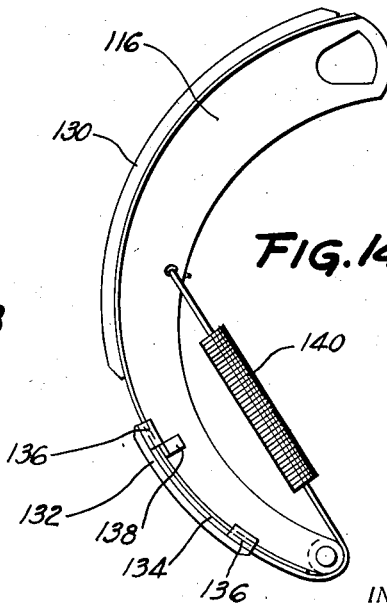
INVENTOR.
ROY S. SANFORD
BY
ATTORNEY.

Patented Nov. 26, 1935

2,022,435

UNITED STATES PATENT OFFICE 2,022,435

BRAKE

Roy S. Sanford, South Bend, Ind., assignor to Bendix Aviation Corporation, South Bend, Ind., a corporation of Delaware Application December 21, 1932, Serial No. 648,300

5 Claims. (Cl. 188—78)

This invention relates to brakes, and is illustrated as embodied in a system of four-wheel automobile brakes of the internal expanding shiftable-anchorage type.

An object of the invention is to improve the operation of the brake, especially when it is of this type, by a novel adjustment for lining wear which consists of a toggle connecting the shoes and linked to an adjustable eccentric; by constructing one or more of the shoes of pivotally-connected sections braced apart by a strut of invar alloy, or other material having a coefficient of expansion different from that of the shoes, so that the shoe automatically changes its curvature as the drum heats up and expands; by mounting on one or more of the shoes a novel movable yieldingly-held friction element which shifts its position on the shoe automatically to compensate for excessive "servo" action; by a novel drum construction providing fluid means for absorbing the heat of braking; and by improvements in the operating mechanism or hookup.

The above and other objects and features of the invention, including various novel combinations of parts and desirable particular constructions, will be apparent from the following description of the illustrative embodiments shown in the accompanying drawings, in which:

Figure 7 is a section through one of the brakes, on the line 7—7 of Figure 1, just inside the head of the brake drum, showing the brake friction means in side elevation;

Figure 8 is a partial section, on the line 8—8 of Figure 7, through the applying and anchoring means of the brake;

Figure 9 is a partial section on the line 9—9 of Figure 7, showing the drum structure;

Figure 13 is a side elevation of the lower shoe in Figure 10;

Figure 14 is a side elevation of the upper shoe in Figure 10;

Figure 15 is a side elevation of the upper shoe in Figure 7; and

Figure 16 is a side elevation of the lower shoe in Figure 7.

Figure 1:
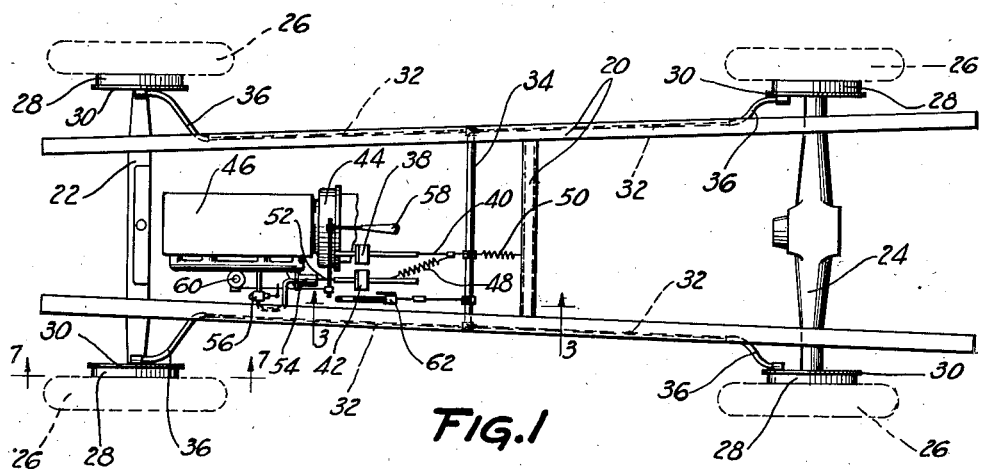
Figure 1 is a top plan view of an automobile chassis embodying my invention.
Figure 2:
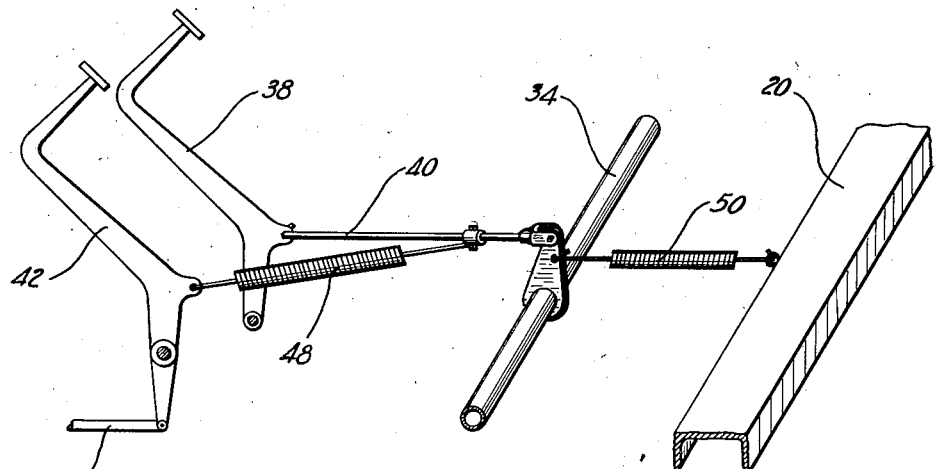
Figure 2 is a perspective view of the brake and clutch pedals and associated parts.
Figure 3:
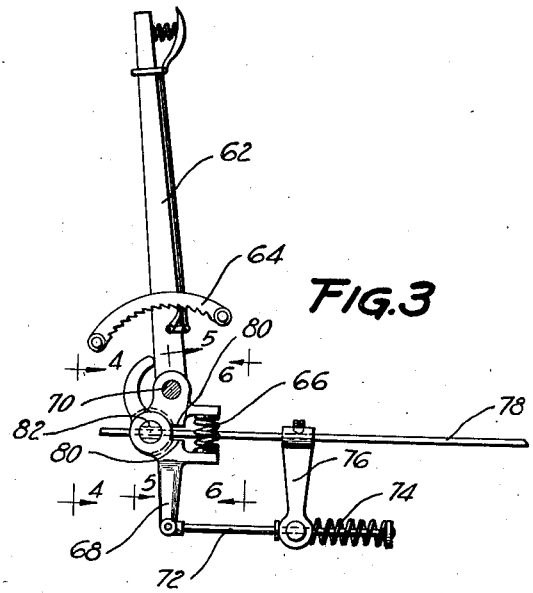
Figure 3 is a partial section on the line 3—3 of Figure 1, showing a novel emergency brake operating mechanism.
Figures 4, 5, 6:
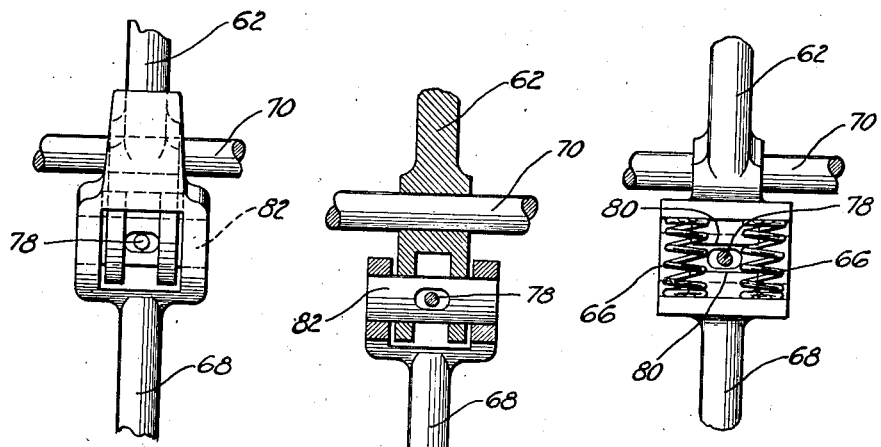
Figure 4 is a front elevation of a portion of the lever mechanism, looking in the direction of the arrows 4—4 of Figure 3.
Figure 5 is a partial section vertically through the mechanism, on the line 5—5 of Figure 3.
Figure 6 is a partial rear elevation of the mechanism, on the line 6—6 of Figure 3.
Figure 10:
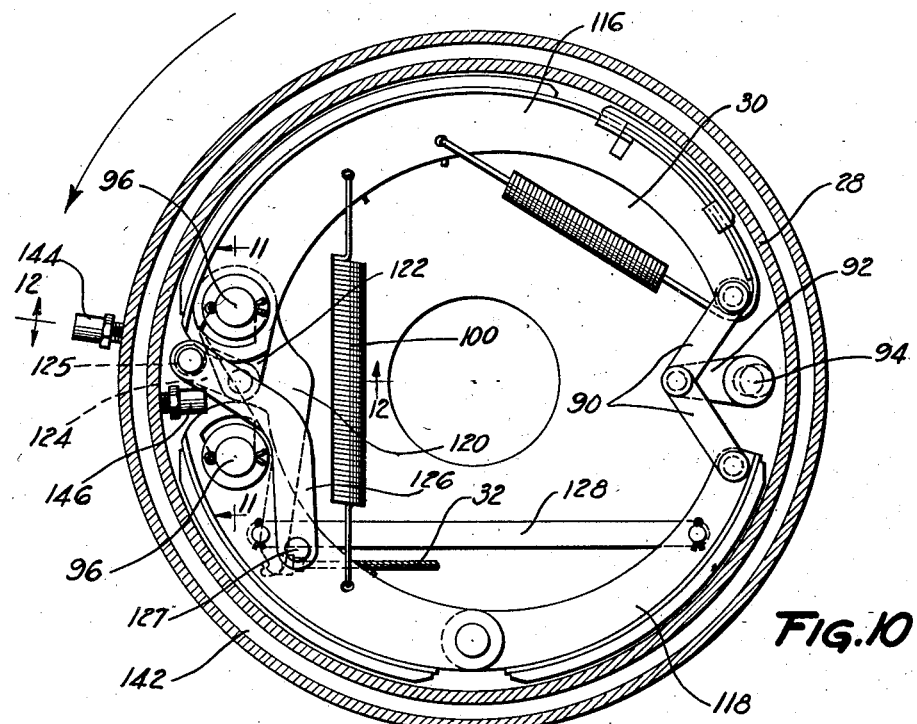
Figure 10 is a section corresponding to Figure 7 but showing a modification.

The chassis illustrated in Figure 1 includes a frame 20, supported on the usual vehicle springs (not shown) carried by a front axle 22 and a rear axle 24. The axles are mounted on the usual road wheels 26, each of which is provided with a brake including a drum 28 at the open side of which is a suitable support such as a backing plate 30 mounted on the rear axle or on the front knuckle. The brakes are applied by means such as a set of cables 32 connected to arms on a cross-shaft 34, and each of which passes at its brake end through a flexible Bowden-type conduit 36 fastened at one end to the frame 10 and at its other end to the inside of the corresponding backing plate 30.

The shaft 34 is rocked, to apply the four brakes, by means such as a pivotally mounted service brake pedal 38 connected thereto by a brake rod 40. The brake pedal 38 is mounted in the usual manner beside the clutch pedal 42 controlling a clutch 44 through which the engine 46 drives the car, and I prefer to arrange a spring 48 connecting the clutch pedal 42 to the brake rod 40, or other part of the brake system, in such a manner that depression of the clutch pedal yieldingly tends to, but does not quite, operate shaft 34 or its equivalent to apply the brakes, the spring 48 being a little lighter than the usual return spring 50 yieldingly holding the brakes in released position.

By this arrangement, depression of the clutch pedal substantially yieldingly balances the brake return spring or springs, thus taking that much load off the right foot when the brakes are applied.

In the arrangement illustrated, the clutch and the clutch pedal are normally operated by the power of the engine through a vacuum clutch control of any known design, the clutch pedal being connected by a rod 52 with a piston in a vacuum cylinder 54 connected through a control valve 56 to the intake manifold of the engine 46.

Valve 56 is controlled, as is customary, by the accelerator pedal 58 which also controls the carburetor 60. When the accelerator pedal is completely released the valve 56 is shifted in the usual manner to a position in which the clutch pedal is automatically depressed by vacuum power. This power therefore also acts at that time to tension the spring 48 balancing the return spring 50.

Alternatively the brakes are applied by a hand emergency lever 62 having a pawl engaging a ratchet 64 to hold the brakes applied when the car is parked. Lever 62 acts through compression springs 66 to operate a bellcrank lever 68 pivoted to lever 62 just below its fulcrum 70. Bellcrank lever 68 is connected, through a pullrod 72 having at its end a stop engaging a compression spring 74, yieldingly to an arm 76 adjustably rigidly mounted on a brake rod 78 connected by a suitable one-way connection to the shaft 34.

Thus lever 62 at first operates, through a long lever arm 68, very rapidly to take up the slack in the system and bring the brake shoes against the drums. As soon as enough resistance occurs so that springs 66 collapse (these being somewhat lighter than spring 74), the lever 62 moves independently of the bellcrank 68, gripping rod 78 between jaws 80 and further operating it through a very short lever arm at a very high leverage to apply a multiplied pressure to the brakes. Spring 74 yields enough to permit this action.

Rod 78 is shown passing through an opening in the pivot 82 which connects the bellcrank 68 to the lever 62, the opening being enough larger than the rod to permit the above-described action. The jaws 80 in effect form a friction ratchet detachably connecting the lever 62 to the rod 78.

In the arrangement illustrated in Figures 7, 8, 9, 15, and 16, the brake proper includes an upper shoe 86 and a lower shoe 88. These shoes are connected, at the right-hand side of the brake, by a toggle comprising links 90, the knuckle of the toggle being connected by a link 92 to an adjustable eccentric 94, which can be turned from outside the brake for the purpose of adjusting the brake.

The ends of the shoes opposite this adjustable connection, at the left of the brake, are formed with openings for the brake anchors 96 mounted on the backing plate. These ends of the shoes are connected by a toggle consisting of curved links 98 and actuated, against the resistance of a return spring 100, by a link 102 connecting the knuckle of the toggle to a lever 104 fulcrumed on the lower anchor 96 and extending upwardly between shoe 86 and the backing plate, where it is connected to the cable 32.

As best appears in Figure 15, shoe 86 has mounted on its outer face two pieces 106 of brake lining, separated by a space 108. This increases the effectiveness of the shoe; at the same time dust forming as the lining wears away, or from any other source, collects in the space 108 and does not change the effectiveness of the lining 106 by collecting on the face of the lining. Shoe 88 (Figure 16) is formed with transverse slots 110 crosswise of the lining, and having enlarged holes 112 in which the dust may collect, and which also serve to receive the heads of the attaching rivets.

The drum 28, in this form of the brake, may have an annular chamber 114 formed in the braking flange, and partly filled with a fluid such as sulphur dioxide or ethyl chloride which has a low boiling point and a high latent heat of evaporation. Thus a considerable part of the heat of braking may be absorbed in vaporizing the fluid in this chamber, thereby minimizing the effect of the heat on the drum, the tires, etc.

The brake of Figures 10, 11, 12, 13 and 14 includes shoes 116 and 118, connected by the above-described adjustable toggle mechanism 90—92—94, and provided with the return spring 100 and the anchors 96. In this case the cable 32 enters at the bottom of the brake and is connected to a lever 120 pivoted on the upper anchor 96, and having an arm 122 connected by a link 124 to the upper end of a link 126 connected to the shoe 118 by a pivot 127 and curved to clear the lower anchor 96. The pivot at the upper end of link 126 also carries a roller 125 (Figure 12) camming against the end of the web of shoe 116.

The lower shoe 118 in this brake comprises pivotally connected sections rigidly connected by a strut 128 of the well-known alloy steel "invar". This has a much lower coefficient of friction than the shoe sections, and automatically changes the curvature of the shoe to compensate for heating and expansion of the drum.

The upper shoe 116 has a relatively long piece 130 of brake lining riveted to its face at the heel end (i. e. the end nearest the anchor). A shorter piece 132 of such lining is fastened on an element 134 overlying the face of the shoe at its toe end. The friction element 134 is guided by suitable clips 136 at the sides of the shoe rim, and is urged against a stop 138, carried by the shoe and engaged by one of the clips, by a spring 140 tensioned between the end of the friction element 134 and the web of the shoe.

When the brake is applied in reverse, the friction element is merely held against stop 138 by the wiping friction of the drum. When the brake is applied in the forward direction, and shoe 116 is the anchored shoe, however, the drum friction tends to wipe element 134 away from the toe of the shoe along its face toward the heel, against the yielding resistance of spring 140. Since the further from the toe of the shoe the lining begins the less is the self-energizing of "servo" effect, it will be seen that increases in the coefficient of friction of the lining are by this arrangement automatically compensated for by a lessened self-energization or "servo" effect, and vice versa.

The drum 28 in this case has an annular chamber 142, containing air as the working fluid. The air is sucked from outside the brake into this chamber, as the brake cools after having been applied, through an inwardly-opening check valve 144. When the brake is applied, the air absorbs part of the heat, expands, and part of it is forced into the interior of the brake through an outwardly-opening check valve 146, carrying with it the heat which it has absorbed.

Since in effect this forms a heat-operated pump, the valve 146 may if desired be connected by a flexible conduit (not shown) to the filler valve of the tire, to keep the tire automatically inflated. There being a check valve in the tire valve, it is not necessary in this case to use a valve 146, and a plain connection may be substituted therefor.

While several illustrative constructions have been described in detail, it is not my intention to limit the scope of the invention to those particular constructions, or otherwise than by the terms of the appended claims.

Figures 11, 12:
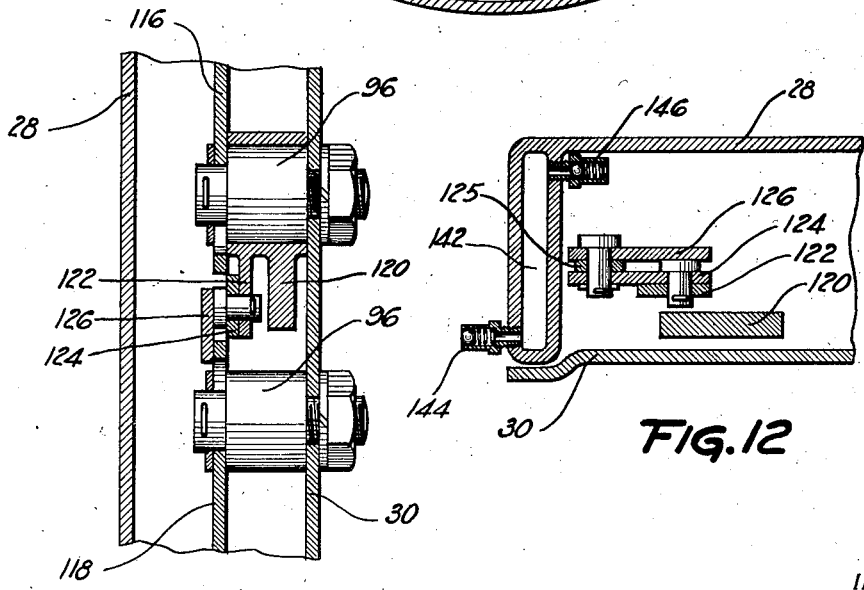
Figure 11 is a partial section, on the line 11—11 of Figure 10, through the applying and anchoring means.
Figure 12 is a partial section, on the line 12—12 of Figure 10, showing the drum structure.

The brake drums shown in Figures 9 and 12 are claimed in my divisional application No. 44,663, filed October 12, 1935.

I claim:

1. A brake having a drum and a pair of floating shoes and a pair of toggles connecting the adacent ends of the shoes at opposite sides of the drum, an eccentric linked to one of the toggles, and an operating lever linked to the other of the toggles.

2. A brake having a drum and a pair of shoes adjustably connected at their ends on one side of the drum and arranged to anchor and to be applied at their ends on the other side of the drum, and at least one of which comprises two relatively-movable connected sections further connected by a strut having a different coefficient of expansion.

3. A brake shoe having pivotally-connected sections connected by an invar strut.

4. A brake having a drum and a pair of shoes adjustably connected at their ends on one side of the drum and arranged to anchor and to be applied at their ends on the other side of the drum, and at least one of which has a relatively long segment of brake lining fixed thereon and a shorter segment of brake lining adjustably mounted thereon.

5. A brake shoe having a relatively long segment of brake lining fixed thereon and a shorter segment of brake lining, adjustably mounted thereon, and means connected to the shoe and the shorter lining segment and urging said segment lengthwise of the shoe.

ROY S. SANFORD.